United States Patent
DeLay

[11] Patent Number: 6,158,605
[45] Date of Patent: Dec. 12, 2000

[54] COMPOSITE TANK

[75] Inventor: Thomas K. DeLay, Huntsville, Ala.

[73] Assignee: The United States of America as represented by the Administrator of the National Aeronautics and Space Administration, Washington, D.C.

[21] Appl. No.: 09/218,652

[22] Filed: Dec. 22, 1998

[51] Int. Cl.[7] .................................................... B65D 7/00
[52] U.S. Cl. ................................... 220/62.17; 589/590
[58] Field of Search ........................... 220/62.15, 62.19, 220/62.17, 62.22, 581, 586, 588, 589, 590

[56] References Cited

U.S. PATENT DOCUMENTS

| | | | |
|---|---|---|---|
| 3,303,079 | 2/1967 | Carter | 220/62.19 X |
| 3,312,575 | 4/1967 | Corbin, Jr. | 220/590 X |
| 3,321,347 | 5/1967 | Price et al. | 220/590 X |
| 3,728,187 | 4/1973 | Martin | 220/62.19 X |
| 3,815,773 | 6/1974 | Duvall et al. | 220/62.19 X |
| 3,843,010 | 10/1974 | Morse et al. | 220/590 |
| 3,866,792 | 2/1975 | Minke | 220/589 |
| 4,438,858 | 3/1984 | Grover | 220/590 |
| 5,476,189 | 12/1995 | Duvall et al. | 220/589 X |
| 5,568,878 | 10/1996 | Le Breton | 220/581 X |

*Primary Examiner*—Steven Pollard
*Attorney, Agent, or Firm*—James J. McGroary

[57] ABSTRACT

A composite tank for containing liquid oxygen and the method of making the same wherein a water-soluble mandrel having the desired tank configuration and a cylindrical protuberance on at least one end is fitted with an inner boss conforming to the configuration of the mandrel and an outer boss conforming to the configuration of the inner boss, the bosses each having a tubular portion for receiving the protuberance on the mandrel and a spherical portion. The mandrel and the bosses are first coated with a nickel coating. The mandrel is then wrapped with graphite fibers wetted with an epoxy resin and this resin is cured. A layer of insulating foam is then applied to the tank and cured. The insulating foam is machined to a desired configuration and a layer of aramid fibers wetted with a second epoxy resin is wrapped around the tank. The second resin is cured and the water soluble mandrel is washed from inside the tank.

4 Claims, 1 Drawing Sheet

COMPOSITE TANK

ORIGIN OF THE INVENTION

This invention was made by an employee of the United States Government and may be manufactured or used by or for the Government for Governmental purposes without the payment of royalties thereon or therefor.

BACKGROUND OF INVENTION

1. Field of the Invention

This invention relates to composite tanks.

2. Prior Art

It is known to make tanks from composite materials for various purposes. There has been considerable prior art in general for double-walled tanks for puncture resistant underground storage of environmentally hazardous chemicals, for example. There is a need for tanks and pressure vessels for the containment of fuels for aerospace and military applications. The new launch vehicles for NASA and DOD require extremely light weight hardware that is compatible with the containment of cryogenic liquid fuels and oxidizers. Long term deep space missions have even more critical and stringent storage requirements.

SUMMARY OF THE INVENTION

A composite tank for containing liquid oxygen and the method of making the same wherein a water-soluble mandrel having the desired tank configuration and a cylindrical protuberance on at least one end is fitted with an inner boss conforming to the configuration of the mandrel and an outer boss conforming to the configuration of the inner boss, the bosses each having a tubular portion for receiving the protuberance on the mandrel and a spherical portion. The mandrel and the bosses are first coated with a nickel coating. The mandrel is then wrapped with graphite fibers wetted with an epoxy resin and this resin is cured. A layer of insulating foam is the applied to the tank and cured. The insulating foam is machined to a desired configuration and a layer of aramid fibers wetted with a second epoxy resin is wrapped around the tank. The second resin is cured and the water soluble mandrel is washed from inside the tank.

DETAILED DESCRIPTION OF THE INVENTION

Figure 1:
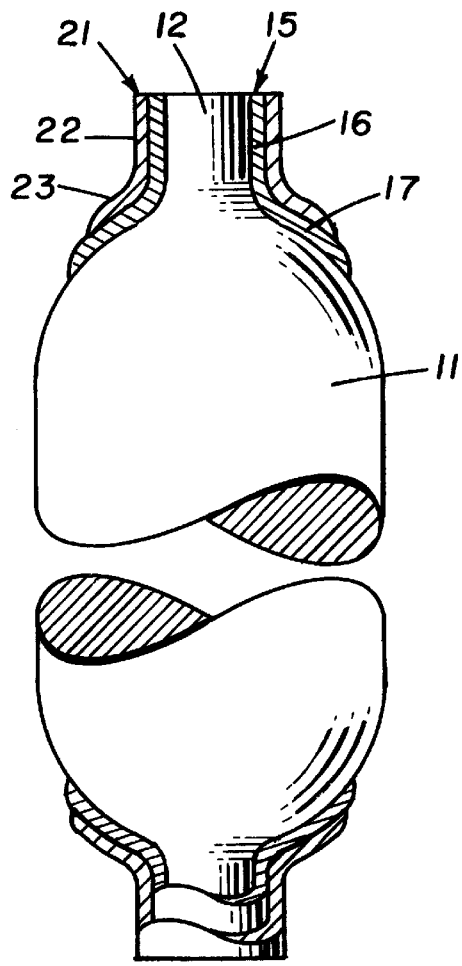
FIG. 1 is a side view of the mandrel on which the composite tank is to be formed showing the inner and outer bosses at the ends of the mandrel.

Referring now in detail to the drawings there is shown in FIG. 1 a mandrel 11 having a desired tank configuration and a pair of cylindrical protuberances 12 extending from each end. Positioned on each protuberance 12 is an inner boss 15 which is made up of a tubular portion 16 and a spherical portion 17. The tubular portion 16 snugly fits the protuberance 12 while the spherical portion conforms to the configuration of the end of the mandrel 11. The inner bosses 15 are made of a nickel plated metal, preferably aluminum.

Positioned on the inner bosses 15 are a pair of outer bosses 21 made up of graphite fibers embedded in a cured epoxy resin matrix. The outer bosses have tubular portions 22 secured to spherical portions 23. The tubular portion s fit snugly on the tubular portions 16 of the inner bosses 15 and the spherical portions 23 conform to the outer surfaces of the spherical portions 17 of the inner bosses 15.

Figure 2:
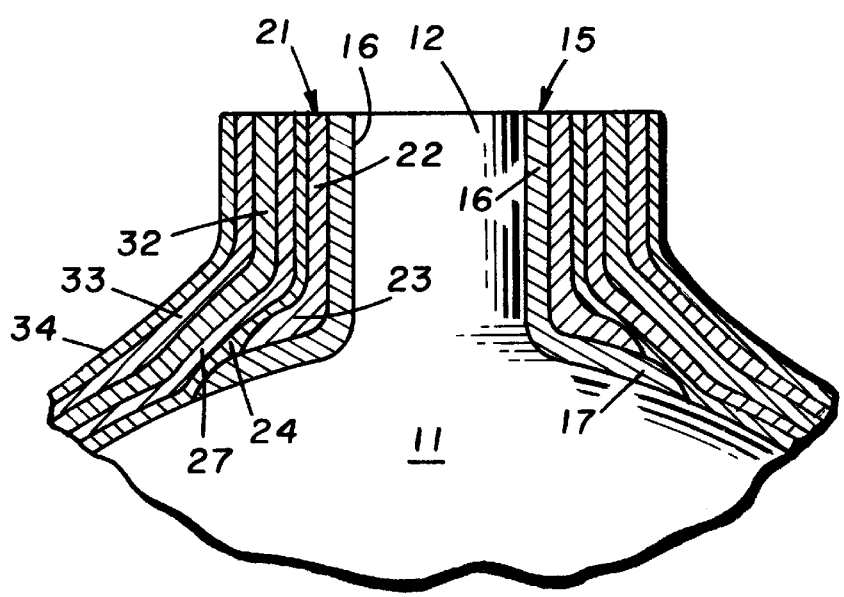
FIG. 2 is a greatly enlarged fragmentary view showing the structure making up the composite tank.

After the inner and outer bosses 15 and 21, respectively, are in place the mandrel and the bosses are coated with a nickel coating 24. This coating, shown in FIG. 2, may be applied by an electroforming process or by a vacuum plasma spraying process. The diameters of the spherical portions 17 of the inner bosses 15 are greater than the diameters of the spherical portions 23 of the outer bosses. This is to insure that when the nickel coating is applied it will cover the exposed portion of the spherical portions 17 of the inner bosses 15 to completely seal the graphite outer bosses 21 in a nickel coating.

After the nickel coating has been applied to the mandrel and the bosses, the mandrel 11 is wrapped with a tow of graphite fibers wetted with an epoxy resin and the epoxy resin is cured to form a first layer 27 of graphite fibers embedded in a cured resin matrix. A layer 32 of an insulating foam is then sprayed onto the tank and, after curing, is machined to the desired configuration. Preferably, the foam is a polyurethane foam A tow of aramid fibers wetted with an epoxy resin in then wrapped over the insulating foam and the resin is then cured to provide a layer 33 of aramid fibers embedded in a cured epoxy resin matrix. If desired, a thin coating 34 of rubber may be sprayed over the aramid fiber layer. The water-soluble mandrel 11 is then washed out of the tank to leave a very strong tank. The bosses at each end provide for access to the interior of the tank.

What is claimed is:

1. A composite tank for holding liquid oxygen, comprising
   a. nickel liner;
   b. a layer of carbon fibers wrapped around the nickel liner in a cured matrix of an epoxy resin;
   c. a layer of foam insulation surrounding the graphite fiber layer;
   d. a layer of an aramid fiber wrapped around the foam insulation, said aramid fiber being in a cured matrix of an epoxy resin, said tank having at least one boss on the periphery thereof, said boss being made up of an inner boss of a metal plated with nickel and an outer boss of graphite fibers in a cured epoxy resin, said nickel liner covering the bosses.

2. The tank of claim 1 wherein the bosses are each made up of a tubular portion secured to a spherical portion having a diameter, the diameter of the spherical portion of the inner boss being greater than the diameter of the spherical portion of the outer boss.

3. The tank of claim 2 wherein the boss is on an end of the tank.

4. The tank of claim 3 wherein the inner boss is nickel plated aluminum.

* * * * *